(12) United States Patent
Kaprielova et al.

(10) Patent No.: US 12,043,791 B2
(45) Date of Patent: Jul. 23, 2024

(54) METHOD FOR FLUID LOSS CONTROL WITH TWO TREATMENT FLUIDS

(71) Applicant: Schlumberger Technology Corporation, Sugar Land, TX (US)

(72) Inventors: Ksenia Mikhailovna Kaprielova, Novosibirsk (RU); Nikita Yurievich Silko, Novosibirsk (RU); Bipin Jain, Sugar Land, TX (US); Elena Vladimirovna Danilevich, Novosibirsk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/251,366

(22) PCT Filed: Nov. 2, 2020

(86) PCT No.: PCT/RU2020/000580
§ 371 (c)(1),
(2) Date: May 1, 2023

(87) PCT Pub. No.: WO2022/093059
PCT Pub. Date: May 5, 2022

(65) Prior Publication Data
US 2023/0407162 A1 Dec. 21, 2023

(51) Int. Cl.
*C09K 8/44* (2006.01)
*C09K 8/42* (2006.01)
(Continued)

(52) U.S. Cl.
CPC .............. *C09K 8/426* (2013.01); *C09K 8/44* (2013.01); *C09K 8/512* (2013.01); *C09K 8/514* (2013.01);
(Continued)

(58) Field of Classification Search
None
See application file for complete search history.

(56) References Cited

U.S. PATENT DOCUMENTS

| 5,663,123 A | * | 9/1997 | Goodhue, Jr. | ........... C09K 8/12 507/221 |
| 9,611,420 B2 | | 4/2017 | George | |

(Continued)

FOREIGN PATENT DOCUMENTS

| RU | 2019682 C1 | 9/1994 |
| RU | 2146690 C1 | 3/2000 |

(Continued)

OTHER PUBLICATIONS

International Search Report and Written Opinion issued in International Patent application PCT/RU2020/000580 on Jul. 15, 2021, 5 pages.
(Continued)

*Primary Examiner* — Andrew Sue-Ako
(74) *Attorney, Agent, or Firm* — Jeffrey D. Frantz (57) ABSTRACT

The method of fluid loss control is provided for the case of high-rate fluid loss. Two treatment fluids are provided, where a first treatment fluid comprising a carrier fluid, solids and a first polyelectrolyte, and a second treatment fluid comprising a carrier fluid and a second polyelectrolyte. Two polyelectrolytes in both treatment fluids are oppositely charged under the pumping conditions, being taken from the classes of polyanionic and polycationic polymers. Two treatment fluids are pumped separately to the zone with fluid loss. The mixing of two treatment fluids into the well creates low-permeability agglomerates that plugs the fluid leakage channel, preventing or reducing further fluid movement between the wellbore and subterranean formation. The plugging of thief zone can be temporary or permanent.

13 Claims, 4 Drawing Sheets

(51) Int. Cl.
*C09K 8/512* (2006.01)
*C09K 8/514* (2006.01)
*E21B 21/00* (2006.01)
*E21B 33/138* (2006.01)

(52) U.S. Cl.
CPC .......... *E21B 21/003* (2013.01); *E21B 33/138* (2013.01); *C09K 2208/08* (2013.01); *E21B 2200/08* (2020.05)

(56) References Cited

U.S. PATENT DOCUMENTS

| | | | |
|---|---|---|---|
| 10,174,568 B2 | 1/2019 | Silko | |
| 10,442,974 B2 | 10/2019 | Whitfill | |
| 2006/0122071 A1* | 6/2006 | Reddy | C09K 8/508 507/219 |
| 2008/0058229 A1 | 3/2008 | Berkland | |
| 2011/0114318 A1* | 5/2011 | Ezell | C09K 8/512 166/305.1 |
| 2013/0327527 A1* | 12/2013 | Fu | C09K 8/03 166/282 |
| 2014/0352969 A1* | 12/2014 | Chung | C09K 8/882 166/305.1 |
| 2015/0060072 A1 | 3/2015 | Busby | |
| 2015/0144339 A1 | 5/2015 | Vladimirovich | |
| 2016/0298018 A1 | 10/2016 | Medvedev | |
| 2018/0135399 A1 | 5/2018 | Semenov | |
| 2018/0238161 A1 | 8/2018 | Kramer et al. | |

FOREIGN PATENT DOCUMENTS

| | | |
|---|---|---|
| WO | 2008112009 A1 | 9/2008 |
| WO | 2013141960 A1 | 9/2013 |

OTHER PUBLICATIONS

Search and Examination report issued in European Patent Application 20960065.9, dated Jun. 10, 2024, 9 pages.

\* cited by examiner

METHOD FOR FLUID LOSS CONTROL WITH TWO TREATMENT FLUIDS

CROSS REFERENCE TO RELATED APPLICATIONS

The present application is a National Stage Entry of International Patent Application No. PCT/RU2020/000580, filed Nov. 2, 2020.

BACKGROUND

The disclosure relates to fluid loss control methods, especially for the cases of severe fluid loss through fractures in subterranean formation.

Lost circulation can be an expensive and time-consuming problem. During drilling, this loss may vary from a gradual lowering of the mud level in the pits to a complete loss of returns. Lost circulation may also pose a safety hazard, leading to well-control problems and environmental incidents. During cementing, lost circulation may severely compromise the quality of the cement job, reducing annular coverage, leaving casing exposed to corrosive subterranean fluids, and failing to provide adequate zonal isolation. Lost circulation may also be a problem encountered during well-completion and workover operations, potentially causing formation damage, lost reserves and even loss of the well.

Lost circulation solutions may be classified into three categories: bridging agents, surface-mixed systems and downhole-mixed systems. Bridging agents, also known as lost-circulation materials (LCMs), are solids of various sizes and shapes (granular, lamellar, fibrous and mixtures thereof). They are generally chosen according to the size of the voids or cracks in the subterranean formation and, as fluid escapes into the formation, congregate and form a barrier that minimizes or stops further fluid flow from the wellbore. Surface-mixed systems are generally fluids composed of a hydraulic cement slurry (or a polymer solution) that enters voids in the subterranean formation, sets or thickens, and forms a seal that minimizes or stops further fluid flow. Downhole-mixed systems generally comprise of two or more fluids that, upon making contact in the wellbore or the lost-circulation zone, form a viscous plug or a precipitate that seals the zone.

Schlumberger Technology Company offers a family of lost circulation pills marketed as Losseal®—based on a combination of fibers and specially sized solid particles. For example, the Losseal Natural Fracture® treatment pill includes a combination of fibers with different mechanical properties, making the treatment less sensitive to fracture sizes.

However, in some instances, the lost circulation may be so severe that traditional lost circulation materials are not effective at arresting lost circulation.

In patent U.S. Ser. No. 10/442,974, a method of fluid loss control is disclosed. The fluid loss circulation pill is prepared at the surface. If the fluid loss exceeds a certain level, this pill with LCM can be improved by adding of water-swellable polymer, salt and fibers. Besides, after the plugging of fluid loss zone is completed, this plug can be degraded by pumping of acids solutions causing partial degrading of the swelled polymer in the degradable pill.

The known methods of well treatment comprise using of polyelectrolyte complex, produced by mixing of two oppositely charged polyelectrolytes (anionic polyelectrolyte and cationic polyelectrolyte) for the purpose of material transport into the wellbore. In US2015144339 the two oppositely charged polyelectrolytes are mixed with proppant particles and other solids for transport of solids into a fracture for heterogeneous proppant placement. Agglomeration of sand with polyelectrolyte complex (e.g., a combination of anionic copolymer a-polyacrylamide and a cationic version c-PAM) ensures the transport of polyelectrolyte agglomerates with captured sand/proppant into the open fracture for final arrangement of proppant pillars. In some versions, the polyelectrolyte complex (PEC clogs) were modified by light solid particles for better transport. In some versions, one of electrolytes is replaced with an ionic surfactant as the agglomeration counterpart. However, this kind of agglomerate cannot ensure secure plugging of big-size fractures/channels and prevent the fluid loss.

In US20080058229 polyelectrolyte complex is used for controlled releases of chemicals delivered to the downhole (inhibitors, scavengers, surfactants). The polyelectrolyte complex with associated chemical agent is presented in the form of nanoparticles. The complex of chitosan (charged long-chain polymer) with dextran sulfate is a typical example of this PEC nanocarrier.

The solutions known from prior art are oriented to mitigation of fluid loss through pores or through channels (fractures) with the width below 5 mm, while these solutions cannot be applied to the channels with the width bigger than 5 mm.

Therefore, the prior art has a lack in a mechanism for improving the fluid loss control through creation of high strength plugs that ensure sustainable plugging of thief zones in the subterranean formation.

SUMMARY

The present disclosure reveals compositions and a method by which well control may be maintained during well drilling, cementing, workover, well killing in a subterranean well.

Embodiments relate to methods for treating a subterranean well having a borehole. Two treatment fluids are provided, where a first treatment fluid comprising a carrier fluid, solids and a first polyelectrolyte, and a second treatment fluid comprising a carrier fluid and a second polyelectrolyte. The second treatment fluid can additionally comprise solids. Both treatment fluids are pumped to the thief zone as they have a moderate viscosity before mixing. Polyelectrolytes in two treatment fluids are oppositely charged under the downhole conditions. Two treatment fluids are placed separately to the zone with fluid loss. Mixing of two treatment fluids in a downhole position produces low-permeability agglomerates that plug the fluid leakage channel, preventing or reducing further fluid movement between the wellbore and the subterranean formation. The plugging of thief zone can be temporary (using a degradable plug) or permanent (with a nondegradable plug).

BRIEF DESCRIPTION OF DRAWINGS

The following figures are included to illustrate certain aspects of embodiments and should not be considered as exclusive embodiments.

DETAILED DESCRIPTION

The prior art offers products for lost circulation control (e.g., Losseal® family from Schlumberger). This is a mixture of fibers and granular materials suspended in a viscous fluid. Depending on the type of zone of fluid loss (also known as "thief zone"), the systems can be either degradable for reservoir zone, or non-degradable for non-reservoir zone. Losseal® pills are noted for the ease of pumping the pill into the thief zone. This put limits on concentrations of solids and fibers for providing a strong and durable plugging of the fluid loss zone.

It was laboratory conditions; the fracture plugging can be modelled through providing a pill flow through a slot of certain width or a piece of tube with a certain diameter. Typically, the known products from Losseal® family can plug a slot (or channel) up to 5 mm, which imitates the fluid loss with moderate filtration rate. The offered solution offers a method for lost circulation control for the situations of severe fluid loss (plugging fractures up to several centimeters width). Indirectly, the plug strength can be evaluated by measuring the maximum pressure difference which the plug withstands.

In the embodiments, the polyelectrolyte (in other terminology, charged polymer) means a long-chain polymer with several changed groups on the polymer chain. The polyelectrolytes can be taken from the class of synthetic polymers, like polyacrylamide (PAM) or from the natural polymers, like chitosan. The class of polyelectrolytes comprises anionic polyelectrolytes and cationic polyelectrolytes. Polyelectrolytes can interact with charged particles in a suspension (colloid), that is why some of polyelectrolytes can be used as flocculant agents. But in general, flocculants have a wider range of charged moieties.

Figure 4:
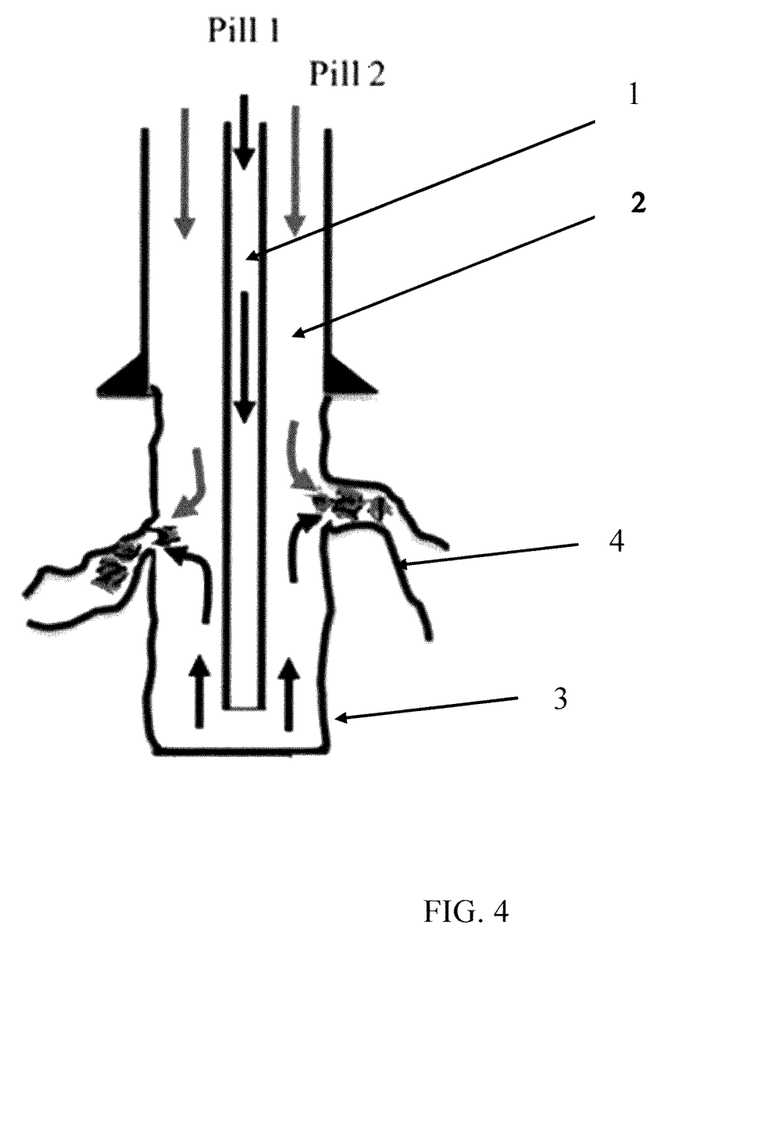
FIG. 4 illustrates a method of pumping for two treatment fluids (two pills) into the thief zone. Here two fluids are mixed at a downhole position and enter the thief zone.

In one embodiment of disclosure, the fluid loss control is achieved by providing the downhole mixing of the first treatment fluid comprising the carrier fluid, solids and the first polyelectrolyte and the second treatment fluid comprising carrier fluid and second polyelectrolyte. This first treatment fluid is pumped to the thief zone through a drillpipe or through the annular space between the drillpipe and casing, while the second treatment fluid is pumped through another side (i.e. through annular space or drillpipe). During the pumping of the first treatment fluid (pill 1 in FIG. 4) it is not mixed with other fluids. FIG. 4 illustrates the method of pumping for creating a plug for the thief zone. The first pill (pill 1 in FIG. 4) is pumped through the drillpipe 1 (central tubing) to the drilling zone 3 of wellbore (depicted as wellbore without casing), where the thief zone 4 occurs. The second treatment fluid (pill 2 in FIG. 4) is pumped through the annular space 2 towards the thief zone 4 and mixed here with pill 1. After mixing of pill 1 and pill 2, a strong agglomerate is formed that enters the fluid loss channel and plugs the thief zone 4.

The examples of solids (solid particles) in the treatment fluids are the fluid-loss material (FLM) typically used in the industry. They are taken from the list comprising calcium carbonate, barite, nut shells, plastics, sulfur, expanded perlite, cottonseed hulls, cellophane flakes, substituted and unsubstituted lactide, glycolide, polylactic acid, polyglycolic acid, a copolymer of polylactic acid and polyglycolic acid, a copolymer of glycolic acid with other hydroxy-, carboxylic acid-, or hydroxycarboxylic acid-containing moieties, a copolymer of lactic acid with other hydroxy-, carboxylic acid or hydroxycarboxylic acid-containing moieties, glycolic acid with itself or other hydroxy-, carboxylic acid-, or hydroxycarboxylic acid-containing moieties, polyvinyl alcohol, polyamide or polyethylene terephthalate or combinations thereof. The choice of FLM depends on the class of plug created in the thief zone. Durable (nondegradable) plugs can be produced on the basis of mineral particles, like calcium carbonate or barite. The degradable plugs can be produced from degradable (in water) solids and fibers, like polylactic acid (PLA) or polyglycolic acid (PGA) that easily degrade at temperatures above 70° C. The solids (FLM) are present in the concentration from 0.5 g/L to 1000 g/L and with an average particle size (D50) between 20 μm and 500 μm, which is a typical range for using of fluid loss materials.

Herein, the carrier fluid has a viscosity sufficient for dispersion of solid particles and fibers to prevent their settling while pumping. The viscosifier agent in the water-based carrier fluid is taken from the list of viscosifiers used for fracturing operations. This can be guar, xanthan gum and hydroxyethylcellulose (HEC) and their neutral derivatives, taken in the form of linear gel or cross-linked gel. The carrier fluid comprises viscosifying agents (polymer gels) with concentrations in the range from 1 g/L to 20 g/L. This concentration of gelling polymer ensures reliable transport of other components (fibers, solids) to the downhole position. The higher concentrations are not used because of cost reasons.

The first polyelectrolyte in the first treatment fluid can be cationic or anionic polymer, wherein the second polyelectrolyte in the second treatment fluid has the opposite sign.

Herein, anionic polymers are selected from the group comprising anionic polyacrylamides (a-PAM), carboxymethylated guar and carboxymethylated cellulose (CMC), carrageenan, lignosulfonate, polyacrylic acid, dextran sulfate. The derivatized polysaccharides have polar carboxylic groups making these polymers more water-soluble and charged at the proper pH of the solution.

Cationic polyelectrolytes (polycations) are less often used in the oilfield industry and more expensive. Examples of polycations include different polyacrylamide polymers with diallyldimethylammonium chloride (DADMAC), polyvinyl pyrrolidone, polyethyleneimine (PEI) and several natural polymers, e.g., chitosan, gelatin and polypeptides.

Also, the method comprises providing the second treatment fluid that includes the carrier fluid and the second polyelectrolyte. The second polyelectrolyte is of the opposite charge, if the first polyelectrolyte is polyanion, the second polyelectrolyte is polycation and vice versa. The proportions between two polyelectrolytes are typically equimolar or in equal mass concentrations. The concentrations of polyelectrolytes in both treatment fluids is in the range from 1 g/L to 20 g/L. The polyelectrolytes at lower concentrations cannot generate polyelectrolyte complex suitable for plugging. Polyelectrolytes with concentration above 20 g/L can be incompatible with other components of treatment fluids.

In one embodiment, the first treatment fluid comprises the carrier fluid, solids and fibers. The fibers are added to the first treatment fluid in concentrations in the range 0.05-50 g/L and the fiber length is in the range 1-30 mm. Adding of fibers makes the final agglomerate stronger due to interaction with solid particles and polyelectrolytes.

The second treatment fluid comprises the carrier fluid and the second polyelectrolyte. The method comprises separate pumping the two treatment fluids to the zone of fluid loss and allowing mixing of two treatment fluids in a downhole position with creating a high strength agglomerate.

The step of pumping of two treatment fluids (two different pills) is carried out by two separate paths (see FIG. 4). For example, the first treatment fluid (pill 1) is pumped through a drill pipe to the drilling zone of uncased wellbore 3, while the second treatment fluid (pill 2) is pumped through the annular space 2 between two tubulars. These two treatment fluids are allowed for mixing near the thief zone (depicted as a big-scale channel in FIG. 4) and produce a high strength agglomerate that is based on the polyelectrolyte complex (PEC) and comprising the solids and fibers from both treatment fluid.

The interaction of polyelectrolytes of opposite charges (polyanions with polycations) results in forming an agglomerate that remains stable for a long period. This polyelectrolyte-based agglomerate is water-insoluble and characterized with low permeability for wellbore fluids.

The rheology of agglomerate is a complicated problem for prediction and measurement; the rheology parameters are sensitive to many factors. However, it is convenient to describe the mixture (agglomerate) rheology through qualitative tests and through measurement of yield stress (e.g., yield stress (in Pa) in ten seconds after mixing). The yield stress measurement is performed for cement slurries, drilling mud, gels, clay paste and other high-viscosity solutions. Herein the term "strong/high strength agglomerate" means an agglomerate that has high values of yield stress. For this disclosure, the "strong/high strength agglomerate" means a slurry with the yield stress higher than 150 Pa. This agglomerate can plug a wide channel (here—18 mm tube) and withhold a high-pressure difference for a long time.

Another approach for comparison of different slurries is the estimate of a maximum pressure difference that the plug (agglomerate) can withstand after placing in flow channels with standard geometries. For convenience sake, the agglomerates were tested for two configurations with an elevating pressure difference; the agglomerate is placed at the entrance of a slot with 5-mm width and to the piece of tube with 18-mm diameter, as shown in Table 1. The positive results for plugging of the 18-mm tube means a high strength agglomerate and a capability of effective plugging and fluid loss control in the field conditions.

In another embodiment of this method, the second treatment fluid comprises dispersed fibers. The fibers in the second treatment fluid are present with concentrations in the range from 0.05 g/L to 50 g/L. Fibrous materials have the length between 1 mm and 30 mm, and the diameter between 8 μm to 200 μm. The adding of fibers to the second treatment fluid makes the final agglomerate stronger.

The fiber size and concentration are chosen to avoid premature bridging in the tube while pumping the second treatment fluid to the thief zone (fluid loss zone). Depending on the goal of plugging, the fibers can be water-degradable and non-degradable fibers. Fibrous materials are made from water-degradable or non-degradable polymeric material comprising the list: polyacryl, polyacrylonitrile, polyamide, polyester, polylactide, polypropylene, their copolymers and or combinations thereof.

The resulting agglomerate is capable of plugging of narrow channels (less than 1 mm) and big-size channels (with width up to several cm).

Mixing of two treatment fluids for fast creation of a PEC-based agglomerate is a feature of the disclosure. In one embodiment, the pills are pumped by different tubulars: one treatment fluid is pumped through a drillpipe (central tube), and the complementing treatment is pumped through the annular space. The mixing of two fluids produces agglomerate in the thief zone.

The alternative version is pumping of two treatment fluids through one tube but separated by a neutral (high-viscous) spacer, e.g., produced from the cross-linked gel. Upon delivery to the target zone, the flow patterns change and mixing of two pills occurs.

The present disclosure can be further understood from the following examples.

Example 1

This example demonstrates formation of a high strength agglomerate that plugs a big-size channel (a tube with ID 18 mm) and this plug can withstand the pressure difference up to 35 bar.

Two treatment fluids (pill 1 and pill 2) pills were prepared in separate vessels. Pill 1 comprises of 2 g/L dispersible xanthan gum, 10 g/L of polylactide fibers (2 mm length), fine particles (D50=40 μm) with concentration of 140 g/L, and anionic polyacrylamide (a-PAM) in concentration 5 g/L.

The second treatment fluid (pill 2) comprises a water solution of hydroxyethyl cellulose (HEC) in concentration 10 g/L, 10 g/L of PLA fiber (6 mm length), and a cationic polyelectrolyte polyethyleneimine (c-PEI)—5 g/L. Pill 1 and pill 2 were put into a vessel and intensively mixed using an overhead mixer and left for rest. In less than 10 seconds, a strong agglomerate with the size about 5-7 cm was observed.

Figure 1:
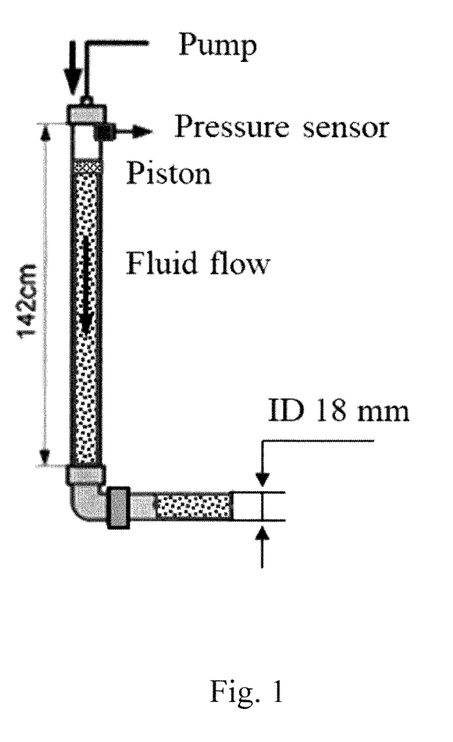
FIG. 1 shows the experimental setup scheme for testing of channel plugging with polyelectrolyte-based agglomerate.
Figure 2:
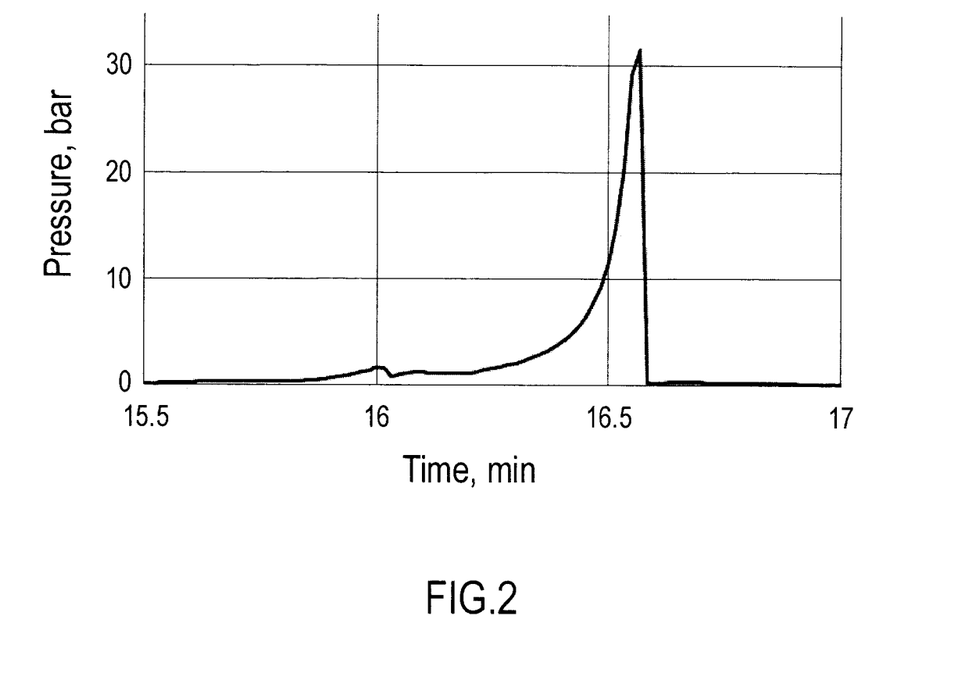
FIG. 2 shows an example of pressure difference evolution in the experimental setup for the plugged tests channel. The plug is a result of mixing two treatment fluids.

Then the slurry with a high strength agglomerate (polyelectrolyte complex, solids, fibers) was placed into the bridging apparatus with a vertical tube with 25 mm diameter (see FIG. 1). The slurry was pumped by a piston with the flow rate of 600 ml/min toward the setup exit. At the exit of the bridging setup, a piece of tube with 18 mm internal diameter was placed as the outlet. The pump was automatically stopped after the pressure reached 35 bar indicating existence of strong and impermeable plug (see pressure evolution in FIG. 2 for a strong plug).

Example 2

This example tests different components for two pills and their ability to form strong agglomerates—ability of plugging a piece of tube with 18 mm inner diameter. If at least one of the components, including oppositely charged polyelectrolytes, fibers, or solids, is missed from the composition, the plugging will be less strong than the complete composition.

Pills of different compositions were tested on plugging ability using the mixing procedure described in Example 1. The mixing of two pills, depending on their composition, generate degradable or non-degradable plugs. Herein, the gradation between degradable-nondegradable plugs is rather arbitrary. The degradable plugs would decompose in one-two days for the downhole conditions—faster than a non-degradable plug. The choice of degradation option is based on the specific needs of the wellbore isolation.

Formed agglomerates or slurry was placed into 25 mm tube of the bridging apparatus (see FIG. 2) and pumped at the flow rate of 600 ml/min. Two types of outlets at the bottom of the bridging apparatus were used: the tube with 18-mm ID (for testing of strong plugs) and 5-mm slot (for plugs of moderate strength). The test was considered as successful if the pump was automatically stopped after the pressure reached 35 bar—this indicates about the impermeable plug (Table 1 column indicate this event as "plugged"). The test considered as unsuccessful if the slurry passed the outlet geometry with no or minimal pressure increase (indicated as "passed"). Table 1 summarizes the compositions of tested pills and the plugging performance results.

The following fibers were tested: PLA (polylactic acid) fibers from Trevira company, PAN (polyacrylonitrile) fibers, PP (polypropylene) fibers. Here PLA fibers are used for a degradable plug.

The viscosifiers for both treatment fluids were from the class of polysaccharides—guar, xanthan gum (non-cross-linked gel), and modified cellulose (HEC—hydroxyethylcellulose).

The polyelectrolyte for the first treatment fluid (column 2 in Table 1) was taken from the class of anionic polyelectrolytes. The example is anionic polyacrylamide (a-PAM). The polyelectrolyte for the second treatment fluid (column 2) was taken from the class of cationic polyelectrolytes (denoted with a prefix c-). The example is cationic polyacrylamide (c-PAM).

The test series in Table 1 was performed with compositions enhanced by degradable fiber materials (e.g., degradable fibers from polylactic acid—PLA).

TABLE 1

Results of plugging performance test for two treatment fluids (degradable plug).

| Test # | First treatment fluid (pill 1) | Second treatment fluid (pill 2) | Testing geometry for plugging | Test result | Permeability, mD | Yield stress of a mixture, Pa |
|---|---|---|---|---|---|---|
| 1 | xanthan gum - 2 g/L, PLA fiber (6 mm) - 10 g/L, calcium carbonate ($D_{50}$ = 40 μm) - 140 g/L, a-PAM - 5 g/L | HEC - 10 g/L, PLA fiber (6 mm) -10 g/L, c-PEI - 5 g/L | 18 mm tube | plugged | 5 | 450 |
|  |  |  | 5 mm slot | plugged | 5 | 450 |
| 2 | xanthan gum - 2 g/L, calcium carbonate ($D_{50}$ = 80 μm) - 140 g/L, a-PAM - 10 g/L, | HEC - 10 g/L, PLA fiber (6 mm) - 30 g/L, c-PEI - 10 g/L | 18 mm tube | plugged | 5 | 500 |
|  |  |  | 5 mm slot | plugged | 5 | 500 |
| 3 | xanthan gum - 2 g/L, calcium carbonate ($D_{50}$ = 40 μm) - 140 g/L, PLA fiber (6 mm) - 5 g/L, DS (dextran sulfate) - 15 g/L, | HEC - 10 g/L, calcium carbonate ($D_{50}$ = 40 μm) - 140 g/L, c-PEI - 5 g/L, no fibers | 18 mm tube | plugged | 24 | 180 |
|  |  |  | 5 mm slot | plugged | 24 | 180 |
| 3 | xanthan gum - 2 g/L, PLA fiber (20 mm) - 10 g/L, a-PAM - 5 g/L | HEC - 10 g/L, PLA fiber (20 mm) - 10 g/L, c-PEI - 5 g/L | 18 mm tube | passed | 1000 | 50 |
|  |  |  | 5 mm slot | plugged | 24 | 50 |
| 4 | xanthan gum - 2 g/L, PLA fiber (6 mm) - 10 g/L, silica particles ($D_{50}$ = 100 μm) - 140 g/L | HEC - 10 g/L, PLA fiber (20 mm) - 10 g/L | 18 mm tube | passed | 1000 | 26 |
|  |  |  | 5 mm slot | plugged | 24 | 26 |
| 5 | xanthan gum - 2 g/L PLA fiber (6 mm) - 17 g/L, calcium carbonate ($D_{50}$ = 40 μm) - 200 g/L | HEC - 10 g/L, PLA fiber (6 mm) - 17 g/L | 18 mm tube | passed | 1000 | 26 |
|  |  |  | 5 mm slot | plugged | 24 | 26 |

As shown in Table 1, if all components are presented in the final mixture of two pills (viscosifier, solid particles, fibers, two polyelectrolytes), a strong agglomerate is formed that can provide a plug with a high yield stress.

Tests in Table 2 were performed with compositions enhanced by nondegradable materials (PAN fibers, polypropylene (PP) fibers).

TABLE 2

Results of plugging performance test for two treatment fluids (nondegradable plug)

| Test # | First treatment fluid (pill 1) | Second treatment fluid (pill 2) | Testing geometry for plugging | Test result | Permeability, mD | Yield stress of a mixture, Pa |
|---|---|---|---|---|---|---|
| 1 | xanthan gum - 2 g/L, calcium carbonate ($D_{50}$ = 40 μm) - 140 g/L, a-PAM - 10 g/L | HEC - 10 g/L, PP fiber (7 mm) - 20 g/L, c-PEI - 10 g/L | 18 mm tube | plugged | 5 | 500 |
|  |  |  | 5 mm slot | plugged | 5 | 500 |

TABLE 2-continued

Results of plugging performance test for two treatment fluids (nondegradable plug)

| Test # | First treatment fluid (pill 1) | Second treatment fluid (pill 2) | Testing geometry for plugging | Test result | Permeability, mD | Yield stress of a mixture, Pa |
|---|---|---|---|---|---|---|
| 2 | guar linear gel - 2.4 g/L, PAN fiber (7 mm) - 17 g/L, Calcium carbonate ($D_{50}$ = 40 μm) - 100 g/L, a-PAM - 5 g/L | guar gel - 2.4 g/L, PAN fiber (7 mm) - 17 g/L, c-PEI - 5 g/L | 18 mm tube | plugged | 5 | 500 |
|   |   |   | 5 mm slot | plugged | 5 | 500 |
| 3 | xanthan gum - 2 g/L, expanded perlite ($D_{50}$ = 280 μm) - 140 g/L, a-PAM - 12 g/L | HEC -10 g/L, PP fiber (8 mm) - 35 g/L, c-PEI - 15 g/L | 18 mm tube | plugged | 5 | 400 |
|   |   |   | 5 mm slot | plugged | 5 | 480 |
| 4 | xanthan gum - 2 g/L, expanded perlite ($D_{50}$ = 280 μm) - 100 g/L, no fibers | HEC -10 g/L, expanded perlite ($D_{50}$ = 280 μm) - 100 g/L, no fibers | 18 mm tube | passed | >50 | 30 |
|   |   |   | 18 mm tube | passed | >50 | 30 |

In these tests, the pill 1 in the test 5 of Table 1 is a typical composition for fluid loss control known from prior art (solid particles, fibers suspended in a linear gel) and was presented for comparison. As shown in this Table 1, these pills can plug only 5-mm slot (demonstrating the yield stress about 26 Pa), but the leakage test fails for a broader testing geometry—18-mm tube. The tests demonstrated that a combination of two pills, which finally comprises two polyelectrolytes, solid particles, and fibers ensure strong plugging by the in-situ agglomerate. Here the strength of agglomerate is estimated from the measured yield stress. Within this disclosure, a strong agglomerate is one with the yield stress higher than 150 Pa (the sample was measured in 10 seconds after mixing of all components). In the framework of this disclosure, the agglomerates with the yield stress below 150 Pa are considered as weak (can plug only a narrow slot), and the compositions with the yield stress higher than 150 Pa are strong agglomerates (for example, tests 1-3 in Table 2).

The agglomerate can be either degradable or nondegradable (comprising durable fibers and non-dissolving solid particles). Here degradable means a composition that undergoes degradation by different mechanisms, involving hydrolysis, dissolving in water-based solutions, temperature-induced degradation that reduce the mechanical strength of the material.

Example 3

This example demonstrates the stability of the plug under pressure and temperature environment.

The plugging test setup represents a tube with the sample connected to the ISCO pump that can sustain constant pressure. Two pills with the composition described in test #1 in Table 1 were mixed using an overhead mixer. Formed agglomerates were separated from the free liquid and placed inside 14 cm tube with ID=13 mm and properly compacted for plug forming. The tube with the composite plug was placed in the oven with temperature set as 90° C. The ISCO pump was connected to the tube and set to the constant pressure mode. This plug was kept for 6 days under the pressure difference of 6 bar. The flow rate through plugged channel was remained constant during the test. Then the pressure was again increased up to 70 bar to ensure that the flow rate would keep at the same level.

Figure 3:
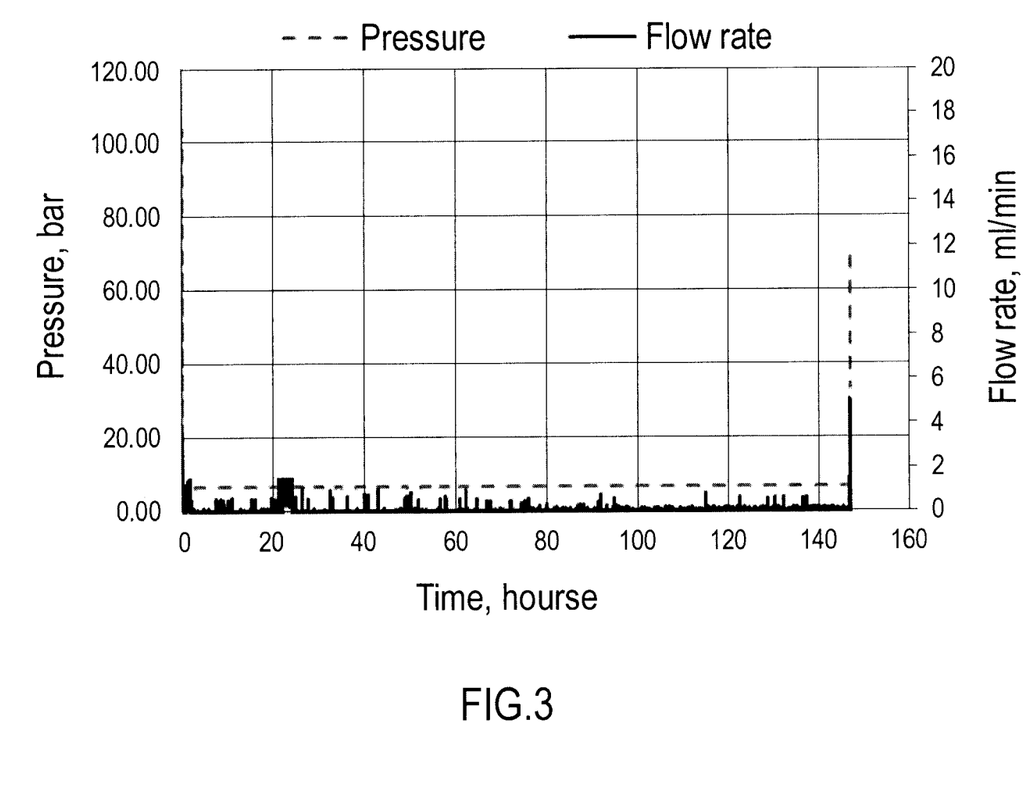
FIG. 3 shows the evolution of pressure and flow rate during the plugging stability test at 90° C. (for a degradable plug). After 150-hs exposure, the plug degrades.

FIG. 3 shows that the flow rate returned to the same level as at the beginning of the experiment. The estimated plug permeability (using Darcy's law) for all testing period did not exceed 5 mDarcy. These results indicate that plug is almost impermeable in environment with high pressures and temperatures.

Example 4

In real downhole conditions two pills should be pumped separately for mixing into a wellbore. One version is pumping the pill 1 through the central tubing and pill 2 through the annulus, as shown in FIG. 4. In this way, the counter-flow of pill 1 and pill 2 enables their rapid and complete mixing and creation of a big-size agglomerate from the pills with two opposite polyelectrolytes (anionic and cationic charged polymers).

Two pills with the composition described in test #1 in Table 1 were pumped separately through 25 mm tubes (plastic tube with 5 m length) with the pumping rate of 30 L/min for each pump. The two pills were mixed via a T-section and released to a barrel. Formation of strong (low-permeable) agglomerates was observed instantly at the end of T-junction and in the barrel. The example illustrates rapid agglomeration from two mixed pills.

The invention claimed is:

1. A method for fluid loss control in a subterranean formation penetrated by a wellbore, comprising:
   (i) providing a first treatment fluid comprising a carrier fluid, solids and a first polyelectrolyte;
   (ii) providing a second treatment fluid comprising a carrier fluid and a second polyelectrolyte,
   wherein one of the first polyelectrolyte and the second polyelectrolyte is selected from a group consisting of carboxymethylated guar and carboxymethylated cellulose (CMC), carrageenan, lignosulfonate, and dextran sulfate,
   wherein the other of the first polyelectrolyte and the second polyelectrolyte is selected from a group consisting of polyacrylamide polymers with diallyldimethylammonium chloride (DADMAC), polyvinyl pyrrolidone, polyethyleneimine (PEI), chitosan, gelatin, and polypeptides, and wherein the first polyelectrolyte is charged oppositely to the second polyelectrolyte;

(iii) separately pumping the first treatment fluid and the second treatment fluid to a zone of fluid loss;

(iv) allowing mixing of the first treatment fluid and the second treatment fluid such that a high strength agglomerate is formed, wherein the high strength agglomerate has a yield stress higher than 150 Pa; and (v) allowing the agglomerate to enter the zone of fluid loss and to plug the zone of fluid loss.

2. The method of claim 1, wherein the first and second treatment fluids each additionally comprise fibers.

3. The method of claim 2, wherein the fibers have a length from 1 mm to 30 mm.

4. The method of claim 2, wherein concentration of the fibers is within a range from 0.05 g/L to 50 g/L.

5. The method of claim 1, wherein concentration of the first polyelectrolyte in the first treatment fluid and concentration of the second polyelectrolyte in the second treatment fluid are each within a range of from 1 g/L to 20 g/L.

6. The method of claim 1, wherein the carrier fluid of the first treatment fluid and the carrier fluid of the second treatment fluid are provided in the form of a water solution of a polymer selected from the group consisting of guar, hydroxypropyl guar, xanthan gum, diutan gum, methylcellulose, ethyl cellulose, hydroxyethylcellulose, hydroxypropylcellulose, and combinations thereof.

7. The method of claim 1, wherein the second treatment fluid additionally comprises solid particles.

8. The method of claim 7, wherein the solid particles have an average particle size (D50) between 20 μm and 500 μm.

9. The method of claim 7, wherein the solid particles are presented in a concentration from 0.5 g/L to 1000 g/L.

10. The method of claim 7, wherein the solid particles are a fluid loss material, taken from a list consisting of calcium carbonate, barite, expanded perlite, nut shells, plastics, cottonseed hulls, cellophane flakes, polylactic acid, polyglycolic acid, polyamide, and polyethylene terephthalate.

11. The method of claim 1, wherein the first treatment fluid is pumped through a drillpipe, and the second treatment fluid is pumped through an annular space.

12. The method of claim 1, wherein the agglomerate forms a degradable plug.

13. The method of claim 1, wherein the agglomerate forms a plug comprising mineral particles, nondegradable fibers, or a combination thereof.

* * * * *